United States Patent
Hirano et al.

(10) Patent No.: US 10,399,300 B2
(45) Date of Patent: Sep. 3, 2019

(54) SURFACE-TREATED METAL PLATE AND METAL PLATE-RESIN COMPOSITE MOLDED ARTICLE

(71) Applicant: Kobe Steel, Ltd., Kobe-shi (JP)

(72) Inventors: Yasuo Hirano, Kakogawa (JP); Takeshi Watase, Kakogawa (JP); Tatsuhiko Iwa, Kakogawa (JP)

(73) Assignee: KOBE STEEL, LTD., Kobe-shi (JP)

( * ) Notice: Subject to any disclaimer, the term of this patent is extended or adjusted under 35 U.S.C. 154(b) by 0 days.

(21) Appl. No.: 15/026,168

(22) PCT Filed: Oct. 30, 2014

(86) PCT No.: PCT/JP2014/078897
§ 371 (c)(1),
(2) Date: Mar. 30, 2016

(87) PCT Pub. No.: WO2015/064689
PCT Pub. Date: May 7, 2015

(65) Prior Publication Data
US 2016/0243794 A1    Aug. 25, 2016

(30) Foreign Application Priority Data

Oct. 31, 2013 (JP) ................................ 2013-227428
Mar. 31, 2014 (JP) ................................ 2014-072082

(51) Int. Cl.
| | |
|---|---|
| B32B 15/08 | (2006.01) |
| B32B 15/095 | (2006.01) |
| B32B 15/085 | (2006.01) |
| B32B 15/088 | (2006.01) |
| B32B 15/20 | (2006.01) |
| B32B 7/12 | (2006.01) |
| B32B 27/20 | (2006.01) |
| B32B 27/32 | (2006.01) |
| B32B 27/34 | (2006.01) |
| B32B 27/40 | (2006.01) |
| C09J 7/28 | (2018.01) |
| C09J 7/35 | (2018.01) |
| C08L 75/04 | (2006.01) |
| C08K 3/36 | (2006.01) |
| B29C 45/14 | (2006.01) |
| B32B 27/30 | (2006.01) |
| B32B 15/18 | (2006.01) |
| B29K 705/00 | (2006.01) |

(52) U.S. Cl.
CPC ........ *B32B 15/08* (2013.01); *B29C 45/14311* (2013.01); *B32B 7/12* (2013.01); *B32B 15/085* (2013.01); *B32B 15/088* (2013.01); *B32B 15/095* (2013.01); *B32B 15/18* (2013.01); *B32B 15/20* (2013.01); *B32B 27/20* (2013.01); *B32B 27/308* (2013.01); *B32B 27/32* (2013.01); *B32B 27/34* (2013.01); *B32B 27/40* (2013.01); *C08K 3/36* (2013.01); *C08L 75/04* (2013.01); *C09J 7/28* (2018.01); *B29K 2705/00* (2013.01); *B32B 2255/06* (2013.01); *B32B 2255/26* (2013.01); *B32B 2262/101* (2013.01); *B32B 2264/102* (2013.01); *B32B 2307/718* (2013.01); *B32B 2419/00* (2013.01); *B32B 2457/00* (2013.01); *B32B 2605/00* (2013.01); *C09J 7/35* (2018.01); *C09J 2400/163* (2013.01); *C09J 2475/003* (2013.01)

(58) Field of Classification Search
None
See application file for complete search history.

(56) References Cited

U.S. PATENT DOCUMENTS

| | | | |
|---|---|---|---|
| 5,531,950 A | 7/1996 | Kimura et al. | |
| 6,458,897 B1 * | 10/2002 | Tokita | C08F 8/44 427/427.5 |
| 8,518,521 B2 * | 8/2013 | Aso | B29C 45/0005 428/141 |
| 2001/0053451 A1 | 12/2001 | Togawa et al. | |
| 2002/0023694 A1 | 2/2002 | Kucera et al. | |
| 2003/0075245 A1 | 4/2003 | Kucera et al. | |
| 2006/0154097 A1 * | 7/2006 | Amano | C09J 133/04 428/520 |
| 2010/0062200 A1 * | 3/2010 | Domes | B05D 7/14 428/35.8 |

(Continued)

FOREIGN PATENT DOCUMENTS

| | | |
|---|---|---|
| JP | 7-124995 A | 5/1995 |
| JP | 2000-239861 A | 9/2000 |

(Continued)

OTHER PUBLICATIONS

Machine translation of JP 2000239861 A( 2000).*

(Continued)

*Primary Examiner* — Frank D Ducheneaux
(74) *Attorney, Agent, or Firm* — Oblon, McClelland, Maier & Neustadt, L.L.P.

(57) ABSTRACT

Provided are: a surface-treated metal sheet that is useful when integrating a molded plastic (resin) article and a metal sheet during injection molding; and a metal sheet-resin composite molded article in which the metal sheet and a resin molded article are integrated. The surface-treated metal sheet consists of a laminate having a metal substrate, a chemical conversion coating film and an adhesive layer in order, and is characterized in that the chemical conversion coating film contains colloidal silica and a thermosetting resin.

7 Claims, No Drawings

(56) References Cited

U.S. PATENT DOCUMENTS

2014/0087241 A1    3/2014   Kuramoto et al.

FOREIGN PATENT DOCUMENTS

| | | |
|---|---|---|
| JP | 2001-341670 A | 12/2001 |
| JP | 2002-178446 A | 6/2002 |
| JP | 2003-301274 A | 10/2003 |
| JP | 2006-169550 A | 6/2006 |
| JP | 2007-98883 A | 4/2007 |
| JP | 2009-137283 A | 6/2009 |
| JP | 2009-248460 A | 10/2009 |
| JP | 2009-275284 A | 11/2009 |
| JP | 2011-37130 A | 2/2011 |
| JP | 2013-23704 A | 2/2013 |
| TW | 200306341 | 11/2003 |
| TW | 201317394 A1 | 5/2013 |
| TW | 201319317 A1 | 5/2013 |
| WO | 2012/133663 A1 | 10/2012 |

OTHER PUBLICATIONS

English translation of the International Preliminary Report on Patentability and Written Opinion dated May 3, 2016 in PCT/JP2014/078897 filed Oct. 30, 2014.

International Search Report dated Jan. 20, 2015 in PCT/JP14/078897 Filed Oct. 30, 2014.

Takashi Nakahata, "Water-Borne polyurethane for adhesives and paints" Adhesion Society of Japan, vol. 40, No. 6, pp. 38-45, (May 10, 2004), (with Partial English Translation).

* cited by examiner

SURFACE-TREATED METAL PLATE AND METAL PLATE-RESIN COMPOSITE MOLDED ARTICLE

CROSS REFERENCE TO RELATED APPLICATIONS

The present application claims priority on the basis of Japanese Patent Application No. 2013-227428, which was filed on 31 Oct. 2013, and Japanese Patent Application No. 2014-072082, which was filed on 31 Mar. 2014. All the contents of the specifications of Japanese Patent Application No. 2013-227428, which was filed on 31 Oct. 2013, and Japanese Patent Application No. 2014-072082, which was filed on 31 Mar. 2014, are incorporated by reference in the present application.

TECHNICAL FIELD

The present invention relates to a surface-treated metal sheet having a coating film that exhibits excellent adhesive properties to a resin (plastic); and to a metal sheet-resin composite molded article obtained using this surface-treated metal sheet.

BACKGROUND ART

Many metal components, including metal sheets, are used in vehicles, domestic appliances, office automation equipment, and the like. In many cases, such metal components are used after being obtained by imparting a metal sheet with a desired shape through pressing and then joining the metal sheet to another metal component or a plastic component by means of welding, screwing, or the like.

Meanwhile, if it is possible to achieve adhesive properties between a plastic and a surface of a metal sheet, it is possible to form a metal sheet-resin composite molded article in which a metal component and a plastic component are bonded to each other simply by pressing the metal sheet, setting the pressed metal sheet in a plastic molding die, injecting a molten plastic and then solidifying the plastic by cooling, and such a process can lead to increased efficiency of the component production process and to a reduction in weight of the component. In addition, resin materials having high affinities for metal sheets or plastics are used as methods for imparting adhesive properties between a plastic and a surface of a metal sheet, and such features have been proposed in, for example, Patent Literature 1 and 2.

Patent Literature 1 discloses forming a polar group-containing thermoplastic resin layer on a surface of a metal sheet in order to join the metal sheet to a molded body comprising a glass fiber-reinforced resin. Specifically, a maleic anhydride-modified polypropylene resin is laminated on a surface of a metal sheet by means of pressing or the like, the obtained laminate is then placed in a mold, and a glass fiber-containing polypropylene resin is then injection molded, thereby integrating the resin and the metal sheet.

However, it is thought that the adhesive strength between the polar group-containing thermoplastic resin layer and the metal sheet is insufficient, and the adhesive strength of the overall metal sheet-resin composite molded article is insufficient simply by using, as an adhesive, a resin material having a high affinity for a plastic to be subsequently joined.

Meanwhile, Patent Literature 2 discloses a resin-coated metal sheet obtained by providing a resin coating film, which contains a heat-sensitive crosslinking agent, on a metal sheet that has not been subjected to chromate treatment. In this invention, adhesive strength between the base metal sheet and the resin coating film is increased by the resin coating film having the heat-sensitive crosslinking agent and a prescribed film strength, but because bonding to a solid adherend (for example, a wood veneer, a plastic sheet, a rubber sheet, a fabric, or the like) is effected by using high temperature heating during baking, this invention is not suitable for cases in which a metal sheet is joined to a molten plastic during injection molding. This is because the period during which a metal sheet and a molten plastic are in contact with each other at a high temperature is extremely short during injection molding, and is not long enough for the heat-sensitive crosslinking agent to undergo a reaction/crosslinking. By further increasing the temperature of the plastic during the injection molding in order to facilitate a reaction of the heat-sensitive crosslinking agent, a longer period of time is required to cool and solidify the plastic, meaning that the advantage of being able to injection mold highly efficiently in a short period of time is lost.

CITATION LIST

Patent Literature

Patent Literature 1: Japanese Unexamined Patent Publication No. 2001-341670

Patent Literature 2: Japanese Unexamined Patent Publication No. 2002-178446

SUMMARY OF INVENTION

In view of the circumstances mentioned above, the present invention addresses the problem of providing a surface-treated metal sheet that is useful when integrating a molded plastic (resin) article and a metal sheet during injection molding and providing a metal sheet-resin composite molded article in which the metal sheet and a resin molded article are integrated.

The surface-treated metal sheet of the present invention sheet consists of a laminate having a metal substrate, a chemical conversion coating film and an adhesive layer in order, and is characterized in that the chemical conversion coating film contains colloidal silica and a thermosetting resin. In addition, the surface-treated metal sheet may have a primer layer between the chemical conversion coating film and the adhesive layer.

In a preferred embodiment of the present invention, the thermosetting resin is a water-based urethane resin, a water-based acrylic-modified epoxy resin or a water-based phenolic resin. In other preferred embodiment, the thermosetting resin is a combination of a water-based carboxyl group-containing acrylic resin and a crosslinking agent which is able to react with a carboxyl group. In addition, the chemical conversion coating film may further contain a silane coupling agent.

The present invention also includes a metal sheet-resin composite molded article obtained by combining the surface-treated metal sheet with a resin molded article, and a preferred mode is one in which the resin molded article is a nylon resin molded article or one in which the resin molded article is a polypropylene resin molded article.

According to the present invention, it is possible to provide a surface-treated metal sheet for combining with a resin molded article, which exhibits excellent adhesive properties to a metal substrate or resin molded article, and also possible to provide a metal sheet-resin composite molded article in which this metal sheet is combined and integrated and which exhibits high adhesive strength.

Therefore, the metal sheet-resin composite molded article of the present invention is useful in a variety of applications, such as automotive components, domestic appliances, construction materials and office automation equipment.

DESCRIPTION OF EMBODIMENTS

The surface-treated metal sheet of the present invention has a structure obtained by laminating a chemical conversion coating film on a metal substrate and then laminating an adhesive layer on the chemical conversion coating film, and is characterized in that the chemical conversion coating film contains colloidal silica and a thermosetting resin. In addition, it is possible to provide a primer layer between the chemical conversion coating film and the adhesive layer in the surface-treated metal sheet. Moreover, in addition to conventional publicly known thermosetting resins such as phenolic resins, the thermosetting resin of the present invention also includes resins which are obtained by combining a thermoplastic resin and a crosslinking agent and which are cured by heating.

[Metal Substrate]

The metal substrate of the surface-treated metal sheet of the present invention is a cold rolled steel sheet, a hot dip pure galvanized steel sheet (GI), a hot dip Zn—Fe alloy-coated steel sheet (GA), a hot dip Zn-5% Al alloy-coated steel sheet (GF), a pure zinc electrogalvanized steel sheet (EG), a Zn—Ni electrogalvanized steel sheet, an aluminum sheet, a titanium sheet, a Galvalume sheet, or the like. A non-chromate metal substrate that has not been subjected to chromate treatment is preferred. The thickness of the metal substrate is not particularly limited, but a thickness of 0.3 to 3.2 mm is preferred in order to reduce the weight of the final product.

[Chemical Conversion Coating Film]
[Colloidal Silica]

The chemical conversion coating film of the present invention contains colloidal silica. This is because colloidal silica exhibits the effect of increasing corrosion resistance. "XS", "SS", "40", "N", "UP", and the like from the SNOWTEX® series (colloidal silica manufactured by Nissan Chemical Industries, Ltd.) can be advantageously used as the colloidal silica. The use of "SNOWTEX-40", which has a surface area average particle diameter of approximately 10 to 20 nm, is particularly preferred. The quantity of colloidal silica is preferably 50 to 150 parts by mass, and more preferably 75 to 125 parts by mass, relative to 100 parts by mass of the thermosetting resin.

[Thermosetting Resin]

A water-based urethane resin, a water-based acrylic-modified epoxy resin or a water-based phenolic resin is preferred as the thermosetting resin contained in the chemical conversion coating film. Moreover, "water-based" means water-soluble or water-dispersible (non-water-soluble).

The water-based urethane resin is preferably one obtained by reacting a polyisocyanate, a polyol and a hydroxyalkanoic acid, and more preferably one obtained by synthesizing a urethane prepolymer comprising a polyisocyanate, a polyol and a hydroxyalkanoic acid and then subjecting this prepolymer to a chain extension reaction.

Examples of the polyisocyanate include yellowing polyisocyanates such as 4,4'-diphenylmethane diisocyanate, 2,4'-diphenylmethane diisocyanate, 2,2'-diphenylmethane diisocyanate, 2,4-toluene diisocyanate, 2,6-toluene diisocyanate, 4,4-toluene diisocyanate, 1,4-naphthalene diisocyanate, 1,5-naphthalene diisocyanate, 1,2-phenylene diisocyanate, 1,3-phenylene diisocyanate and 1,4-phenylene diisocyanate; yellowing-resistant polyisocyanates such as o-xylylene diisocyanate, p-xylylene diisocyanate and m-xylylene diisocyanate; non-yellowing polyisocyanates such as 4,4'-dicyclomethane diisocyanate, 2,4'-dicyclomethane diisocyanate, 2,2'-dicyclomethane diisocyanate, hexamethylene diisocyanate, tetramethylxylylene diisocyanate, isophorone diisocyanate and lysine diisocyanate; and polymers such as crude toluene diisocyanate and polyphenylene-polymethylene isocyanate. These polyisocyanates may be adducts. It is possible to use one of these polyisocyanates, or a mixture of two or more types thereof.

Examples of the polyol include 1,4-cyclohexane diol, 1,4-cyclohexane dimethanol, bisphenol A, bisphenol F and bisphenol S.

Examples of hydroxyalkanoic acids include 2,2-dimethylol acetic acid, 2,2-dimethylol propionic acid, 2,2-dimethylol butyric acid and dimethylol butanoic acid, but from perspectives such as reactivity and solubility, the use of dimethylol propionic acid or dimethylol butanoic acid is preferred.

Examples of preferred chain extenders include polyamines, such as ethylene diamine or propylene diamine.

Examples of this type of water-based urethane resin include "SUPERFLEX® 170" and "SUPERFLEX® 210" (both of which are manufactured by Dai-ichi Kogyo Seiyaku Co., Ltd.).

The acrylic-modified epoxy resin can be produced by, for example, copolymerizing (meth)acrylic acid with a polymerizable unsaturated group-containing epoxy resin obtained by reacting an epoxy resin with an unsaturated fatty acid or by copolymerizing (meth)acrylic acid with a polymerizable unsaturated group-containing epoxy resin obtained by reacting an epoxy resin, a glycidyl group-containing vinyl monomer and amines.

In particular, water-based acrylic-modified epoxy resins are commercially available, and examples thereof include "MODEPICS® 301", "MODEPICS® 302", "MODEPICS® 303" and "MODEPICS® 304", all of which are manufactured by Arakawa Chemical Industries, Ltd. It is possible to use one of these acrylic-modified epoxy resins, or a combination of two or more types thereof.

Water-based phenolic resins include products of addition condensation reactions between a compound having a phenolic —OH group, such as phenol, cresol, p-alkylphenol compounds, p-phenylphenol, chlorophenol, bisphenol A, phenolsulfonic acid and resorcin, and an aldehyde, such as formalin or furfural, and there are many types of such water-based phenolic resins. Of these, a preferred example is the emulsion type "SUMILITE RESIN® PR-14170" (water-based phenolic resin, manufactured by Sumitomo Bakelite Co., Ltd.).

The thermosetting resin contained in the chemical conversion coating film in the present invention also includes resins obtained by combining a thermoplastic resin and a crosslinking agent, and such a combination is cured and loses thermoplasticity when heated, and can therefore be called a type of thermosetting resin. A water-based carboxyl group-containing acrylic resin can be advantageously used in the present invention as this type of resin.

The water-based carboxyl group-containing acrylic resin is an alkali-neutralized product of a copolymer of 50 mass % or less of an unsaturated carboxylic acid, such as (meth) acrylic acid, and a (meth)acrylic acid ester or the like. Specific examples of (meth)acrylic acid esters include methyl (meth)acrylate, ethyl (meth)acrylate, butyl (meth)

acrylate, 2-ethylhexyl (meth)acrylate, iso-octyl (meth)acrylate, iso-nonyl (meth)acrylate, isobornyl (meth)acrylate, N,N-dimethylaminoethyl (meth)acrylate, iso-butyl (meth) acrylate and 4-hydroxybutyl (meth)acrylate. Commercially available water-based carboxyl group-containing acrylic resins include the water-soluble "JURYMER® ET-410" (water-based carboxyl group-containing acrylic resin, manufactured by Toagosei Co., Ltd.).

Any crosslinking agent can be used as the crosslinking agent that is combined with the water-based carboxyl group-containing acrylic resin, so long as it is able to react with a carboxyl group, and an epoxy-based crosslinking agent or a carbodiimide compound is preferable. Examples of epoxy-based crosslinking agents include poly(glycidyl ethers) such as sorbitol poly(glycidyl ether), (poly)glycerol poly(glycidyl ether), pentaerythritol poly(glycidyl ether), trimethylolpropane poly(glycidyl ether), neopentylglycol diglycidyl ether and (poly)ethylene glycol diglycidyl ether, and polyglycidylamines.

In addition, the carbodiimide compound can be produced by heating isocyanates in the presence of a carbodiimidation catalyst, and can be rendered water-based (water-soluble, water-emulsifiable or water-dispersible) by means of modification. In the present invention, a water-based carbodiimide compound is preferred because it is preferable for the coating liquid used to form the chemical conversion coating film to be water-based. In addition, a compound containing a plurality of carbodiimide groups per molecule is preferred. If a plurality of carbodiimide groups are present in the molecule, it is possible to further improve corrosion resistance or the like as a result of crosslinking reactions with carboxyl groups in the resin component.

Examples of commercially available polycarbodiimide compounds include the "CARBODILITE®" series, which are polycarbodiimide compounds (polymers having a plurality of carbodiimide groups per molecule) manufactured by Nisshinbo Chemical Inc. Preferred grades of the "CARBODILITE®" series include the water-soluble "SV-02", "V-02", "V-02-L2" and "V-04" and the emulsion type "E-01" and "E-02". These carbodiimide compounds can be combined with the urethane resin mentioned above. The carbodiimide compound is preferably blended at a quantity of 5 to 20 parts by mass relative to 100 parts by mass of the water-based acrylic resin or water-based urethane resin.

[Silane Coupling Agent]

It is preferable to blend a silane coupling agent in the coating liquid used to form the chemical conversion coating film. It is possible to improve the adhesive properties of the chemical conversion coating film to the metal substrate. Specific examples of silane coupling agents include amino group-containing silane coupling agents such as γ-aminopropyltrimethoxysilane, γ-aminopropyltriethoxysilane, N-(β-aminoethyl)-γ-aminopropyltrimethoxysilane and N—(β-aminoethyl)-γ-aminopropylmethyldimethoxysilane; glycidoxy group-containing silane coupling agents such as γ-glycidoxypropyltrimethoxysilane, γ-glycidoxypropylmethyldimethoxysilane, γ-glycidoxypropyltriethoxysilane and γ-glycidoxymethyldimethoxysilane; vinyl group-containing silane coupling agents such as vinyltrimethoxysilane, vinyltrietboxysilane and vinyl-tris(β-methoxyethoxy)silane; methacryloxy group-containing silane coupling agents such as γ-methacryloxypropyltrimethoxysilane; mercapto group-containing silane coupling agents such as γ-mercaptopropyltrimethoxysilane and γ-mercaptopropylmethyldimethoxysilane; and halogen group-containing silane coupling agents such as γ-chloropropylmethoxysilane and γ-chloropropyltrimethoxysilane. It is possible to use one of these silane coupling agents, or a combination of two or more types thereof. Of these, amino group-containing silane coupling agents and glycidoxy group-containing silane coupling agents are preferred from the perspective of achieving good bonding strength of the ultimately obtained metal sheet-resin composite molded article, and amino group-containing silane coupling agents are particularly preferred. It is preferable for the quantity of silane coupling agent to be 5 to 30 parts by mass relative to 100 parts by mass of solid content in the coating liquid used to form the chemical conversion coating film.

[Acid]

An acid or a salt thereof may be added to the coating liquid used to form the chemical conversion coating film in order to activate the surface of the metal. Examples of acids able to be used include phosphoric acids such as orthophosphoric acid and meta-phosphoric acid, phosphate compounds, such as ammonium salts such as diammonium hydrogen phosphate; and hexafluorometal acids such as hexafluorophosphoric acid and sodium salts thereof. In cases where such an acid is used, the usage quantity thereof is preferably approximately 0.1 to 50 mass % in the chemical conversion coating film. If this usage quantity is lower than 0.1 mass %, a corrosion resistance improvement effect may not be achieved. If this usage quantity exceeds 50 mass %, there are concerns that the chemical conversion coating film will become brittle.

[Formation of Chemical Conversion Coating Film]

Other publicly known additives may be added to the coating liquid when forming the chemical conversion coating film. The method for forming the chemical conversion coating film on the metal substrate is not particularly limited, and a conventional publicly known coating method may be used, for example, it is possible to coat the coating liquid used to form the chemical conversion coating film on one surface or both surfaces of a metal sheet using a roll coating method, a spray coating method, a curtain flow coating method, or the like, and then heating and drying the coated liquid. The heating and drying temperature is not particularly limited, but heating and drying is carried out at a temperature at which the thermosetting resin does not undergo a thermosetting reaction. If a thermosetting reaction occurs when forming the chemical conversion coating film, the adhesive strength to the subsequently laminated adhesive layer deteriorates. Because the coating liquid used to form the chemical conversion coating film is water-based, it is desirable to carry out heating for a period of between several tens of seconds and several minutes at a temperature of approximately 100° C., at which water evaporates.

The coating weight of the chemical conversion coating film is not particularly limited, but is preferably 0.01 to 1 g/m$^2$, and more preferably 0.05 to 0.5 g/m$^2$. If the coating weight is less than 0.01 g/m$^2$, there are concerns that the adhesive strength improvement effect achieved by the chemical conversion coating film will be insufficient, and if the coating weight exceeds 1 g/m$^2$, the adhesive strength improvement effect levels out, which leads to waste in terms of cost.

[Primer Layer]

It is preferable to provide a primer layer between the chemical conversion coating film and the adhesive layer in order to increase the adhesive properties between the chemical conversion coating film and the adhesive layer. The composition of the primer layer in the present invention is not particularly limited as long as adhesive properties between the chemical conversion coating film and the adhesive layer are maintained, and a resin that is identical to, or different from, that in the adhesive layer may be contained in the primer layer. In addition, the primer layer may be pre-coated or post-coated.

It is preferable for the primer layer to contain 0.5 vol. % or more of inorganic material. If the content of inorganic material is less than 0.5 vol. %, the coefficient of thermal expansion of the primer layer becomes too high relative to the coefficient of thermal expansion of the metal substrate, residual thermal stress, which occurs when the temperature of the surface-treated metal sheet decreases from the formation temperature to room temperature, tends to increase, and there are concerns that the adhesive strength of the metal sheet-resin composite molded article will deteriorate. In addition, in order to suppress corrosion of the surface-treated metal sheet, it is preferable to use a rust inhibitor such as calcium ion-exchanged silica or aluminum phosphate as the inorganic material.

[Adhesive Layer]

An adhesive layer is provided after forming the chemical conversion coating film. The adhesive is preferably one that exhibits excellent adhesive properties to the subsequently combined resin. For example, if combined with a nylon resin molded article, an adhesive used for nylon is preferred, and if combined with a polypropylene resin molded article, an adhesive used for polypropylene is preferred. Specifically, hot melt type urethane-based adhesives, hot melt type nylon-based adhesives, urethane-modified nylon-based adhesives, urethane-modified olefin-based adhesives, acid-modified polypropylene-based adhesives, chlorinated polypropylene-based adhesives, polyester-based adhesives, and the like, are preferred. Moreover, in cases where a primer layer is provided on the surface-treated metal sheet, a primer-treated metal sheet is formed by carrying out primer treatment on the chemical conversion coating film, and providing an adhesive layer on the primer layer.

A hot melt type adhesive can be coated in a molten state on the chemical conversion coating film or on the primer-treated metal sheet. In addition, an adhesive may be coated on the chemically treated metal sheet or primer-treated metal sheet in the form of a solution obtained by dissolving the adhesive in an organic solvent or in the form of an aqueous dispersion obtained by dispersing the adhesive in water. After coating the adhesive, the adhesive is heated for 1 to 3 minutes at a temperature that is suitable for the type of adhesive (for example, 180 to 230° C.). At this point, a thermosetting reaction of the thermosetting resin occurs in the chemical conversion coating film.

The thickness of the adhesive layer is not particularly limited, but is preferably approximately 5 to 40 μm, and more preferably 10 to 30 μm, in terms of thickness after drying. If this thickness is less than 5 μm, there are concerns that adhesive strength to a resin molded article will decrease, and even if this thickness exceeds 40 μm, no particular improvement in adhesive strength is seen, and this is therefore not preferred from a cost perspective. By laminating the adhesive layer, the surface-treated metal sheet of the present invention is completed.

[Metal Sheet-Resin Composite Molded Article]

The surface-treated metal sheet of the present invention is preferably used in combination with a resin molded article. Here, if processing is required, the surface-treated metal sheet is processed into the target shape in advance. Next, the processed surface-treated metal sheet is placed in a mold in an injection molding machine, the mold is clamped shut, a molten resin is injected into the mold, and when the resin cools and solidifies, a metal sheet-resin composite molded article is obtained. Of course, the surface-treated metal sheet of the present invention may be combined with a resin by means of a press molding method, but it is preferable to use an injection molding method because of advantages such as the short period of time required for injection molding and the high efficiency thereof.

The injection molding conditions may be altered as appropriate according to the type of resin that constitutes a molded article, and in cases where the resin of the molded article is nylon 6, it is possible to use a cylinder temperature of approximately 240 to 250° C., a mold temperature of approximately 70 to 80° C., an injection holding time of approximately 5 to 8 seconds and a cooling time of approximately 20 to 30 seconds, and in cases where the resin of the molded article is polypropylene, it is possible to use a cylinder temperature of approximately 230 to 250° C., a mold temperature of approximately 45 to 55° C., and injection holding time of approximately 5 to 8 seconds and a cooling time of approximately 20 to 30 seconds. By injection molding under these conditions, it is possible to obtain the metal sheet-resin composite molded article of the present invention, in which the adhesive is strongly bonded to the surface-treated metal sheet.

The resin for the molded article can be any resin used for publicly known molded articles, and is not particularly limited, but examples of preferred resins include nylon resins and polypropylene resins. In order to increase strength as a molded article, it is possible to add approximately 5 to 60 mass % of reinforcing fibers such as glass fibers or carbon fibers. In addition, it is possible to add a variety of publicly known additives, such as pigments and dyes, flame retardants, antimicrobial agents, antioxidants, plasticizers and lubricants.

The present application claims priority on the basis of Japanese Patent Application No. 2013-227428, which was filed on 31 Oct. 2013, and Japanese Patent Application No. 2014-072082, which was filed on 31 Mar. 2014. All the contents of the specifications of Japanese Patent Application No. 2013-227428, which was filed on 31 Oct. 2013, and Japanese Patent Application No. 2014-072082, which was filed on 31 Mar. 2014, are incorporated by reference in the present application.

EXAMPLES

The present invention will now be explained in greater detail through the use of the examples given below, but is not limited to the examples given below, and any change that does not deviate from the gist of the present invention is encompassed by the present invention. Moreover, parts means parts by weight and % means mass %, unless otherwise indicated.

Experimental Example 1

Chemically treated metal sheets were obtained by coating a coating liquid for forming a chemical conversion coating film at a coating weight of 0.5 g/m$^2$ (hereinafter referred to as a chemical conversion coating liquid) on a surface of a galvannealed steel sheet having a thickness of 0.8 mm using a bar coater, and then heating for 1 minute at 100° C. The details of the thermosetting resins (the water-soluble carboxyl group-containing acrylic resin is a thermoplastic resin prior to crosslinking) are shown in Table 1, and the details of the coating liquids are shown in Table 2. Moreover, the "SUPERFLEX" (water-based urethane resin), "SUMILITE RESIN" (water-based phenolic resin). "MODEPICS" (water-based acrylic-modified epoxy resin), and "JURYMER"

(water-based carboxyl group-containing acrylic resin) mentioned in Tables 1 and 2 are all registered trademarks held by the respective manufacturers. In addition, the "ST-40" shown in the Colloidal silica column is "SNOWTEX® 40" (colloidal silica manufactured by Nissan Chemical Industries, Ltd.), and the "KBM903" shown in the silane coupling agent column is γ-aminopropyltrimethoxysilane, manufactured by Shin-Etsu Chemical Co., Ltd.

TABLE 1

| Type | Brand name | Manufacturer |
|---|---|---|
| Resin | | |
| Polyurethane emulsion | Superflex 170 Solid content 33% | Dai-ichi Kogyo Seiyaku Co., Ltd. |
| Phenol resin emulsion | Sumilite Resin PR-14170 Solid content 65% | Sumitomo Bakelite Co., Ltd. |
| Acrylic-modified epoxy resin emulsion | Modepics 302 Solid content 33% | Arakawa Chemical Industries, Ltd. |
| Water-soluble carboxyl group-containing acrylic resin | Jurymer ET-410 Solid content 30% | Toagosei Co., Ltd. |
| Crosslinking agent | | |
| Carbodiimide compound | Carbodilite SV-02 Solid content 40% | Nisshinbo Chemical Inc. |

TABLE 2

| Coating liquid No. | Resin Brand name | Added quantity (parts) | Crosslinking agent Brand name | Added quantity (parts) | Colloidal silica Brand name | Added quantity (parts) | Silane coupling agent Brand name | Added quantity (parts) |
|---|---|---|---|---|---|---|---|---|
| 1 | Superflex 170 | 45 | Carbodilite SV-02 | 5 | ST-40 | 50 | KBM903 | 10 |
| 2 | Sumilite Resin PR-14170 | 50 | — | — | ST-40 | 50 | KBM903 | 10 |
| 3 | Modepics 302 | 50 | — | — | ST-40 | 50 | KBM903 | 10 |
| 4 | Jurymer ET-410 | 45 | Carbodilite SV-02 | 5 | ST-40 | 50 | KBM903 | 10 |
| 5 | Jurymer ET-410 | 50 | — | — | ST-40 | 50 | KBM903 | 10 |
| 6 | — | — | — | — | ST-40 | 50 | KBM903 | 10 |

Surface-treated metal sheets were obtained by coating the urethane-modified olefin-based adhesive "Hytec U-2078" manufactured by Tobo Chemical Industry Co., Ltd. (a coating material type adhesive suitable for nylon resins) at a film thickness of 20 μm on the chemical conversion coating film of the chemically treated steel sheet using a bar coater, and then heating and drying for 2 minutes at 190° C.

Next, injection molding was carried out using an injection molding machine (PNX60, manufactured by Nissei Plastic Industrial Co., Ltd.). Each of the surface-treated metal sheets was cut to a size of 100 mm×25 mm and placed in a mold, and nylon 6 containing 30% of glass fibers (AMILAN® CM 1011G-30 manufactured by Toray Industries, Inc.) was melted and injected so as to have a size of 100 mm×25 mm and a thickness of 3 mm. The resin and the surface-treated metal sheet were bonded so as to overlap for a length of 12.5 mm and a width of 25 mm. The injection conditions are shown in Table 3.

TABLE 3

| Molding machine | | PNX60 injection molding machine manufactured by Nissei Plastic Industrial Co., Ltd. |
|---|---|---|
| Shape of molded article | | 100 × 25 × 3.0 mm (Insert side: 0.8 mmt) |
| Cylinder temperature (° C.) | Nozzle | 250 |
| | Front part | 250 |
| | Central part | 250 |
| | Rear part | 250 |
| | Rearmost part | 240 |
| Mold temperature (° C.) | | 70-80 |
| Injection pressure | Limit pressure (MPa) | 55 |
| | Holding pressure (MPa) | 65 |
| Filling speed (mm/s) | | 10 |
| Rotational speed of screw (rpm) | | 80 |
| Back pressure (MPa) | | 5.0 |
| Settings | Injection holding pressure time (s) | 6.5 |
| | Cooling time (s) | 25.0 |
| | Intermediate time (s) | 0.3 |
| | Metering finishing position (mm) | 30.0 |
| | V-P switching position (mm) | 8.0 |
| Actual measurements | Measuring (s) | 5.10 |
| | Packing (s) | 2.53 |
| | 1 cycle (s) | — |

An end of the obtained metal sheet-resin composite molded article in the length direction was held by a chuck of a tensile strength tester in an atmosphere at 25° C., pulled at a pulling rate of 10 mm/min, and the strength at breaking was taken to be the adhesive strength. The evaluation results are shown in Table 4. All the examples exhibited high adhesive strengths.

TABLE 4

| Run No. | Coating liquid No. | Adhesive strength (MPa) | Notes |
|---|---|---|---|
| 1 | 1 | 15.2 | Urethane + crosslinking agent; example |
| 2 | 2 | 16.9 | Epoxy; example |
| 3 | 3 | 16.4 | Phenol; example |
| 4 | 4 | 17.0 | Acrylic + crosslinking agent; example |
| 5 | 5 | 14.4 | Acrylic only; comparative example |
| 6 | 6 | 13.8 | No resin; comparative example |

Experimental Example 2

Surface-treated metal sheets were obtained by using a bar coater to coat an acid-modified polypropylene-based adhesive ("UNISTOL® R-300" manufactured by Mitsui Chemicals, Inc.) (a coating material type adhesive suitable for polypropylene) at a film thickness of 20 μm on the chemical conversion coating film of the chemically treated steel sheets obtained in Experimental Example 1, and then heating and drying for 2 minutes at 220° C.

Injection molding was carried out and the adhesive strengths of the obtained metal sheet-resin composite molded articles were measured in the same way as in Experimental Example 1, except that polypropylene containing 30% of glass fibers (Prime Polypro E7000 manufactured by Prime Polymer Co., Ltd.) was used instead of nylon 6. The injection molding conditions are shown in Table 5, and the adhesive strength results are shown in Table 6. All the examples exhibited high adhesive strengths.

TABLE 5

| Molding machine | | PNX60 injection molding machine manufactured by Nissei Plastic Industrial Co., Ltd. |
|---|---|---|
| Shape of molded article | | 100 × 25 × 3.0 mm (Insert side: 0.8 mmt) |
| Cylinder temperature (° C.) | Nozzle | 240 |
| | Front part | 250 |
| | Central part | 250 |
| | Rear part | 240 |
| | Rearmost part | 230 |
| Mold temperature (° C.) | | 45-55 |
| Injection pressure | Limit pressure (MPa) | 40 |
| | Holding pressure (MPa) | 50 |
| Filling speed (mm/s) | | 10 |
| Rotational speed of screw (rpm) | | 80 |
| Back pressure (MPa) | | 5.0 |
| Settings | Injection holding pressure time (s) | 6.5 |
| | Cooling time (s) | 25.0 |
| | Intermediate time (s) | 0.3 |
| | Metering finishing position (mm) | 30.0 |
| | V-P switching position (mm) | 7.5 |
| Actual measurements | Measuring (s) | 7.38 |
| | Packing (s) | 2.47 |
| | 1 cycle (s) | — |

TABLE 6

| Run No. | Coating liquid No. | Adhesive strength (MPa) | Notes |
|---|---|---|---|
| 7 | 1 | 11.7 | Urethane + crosslinking agent; example |
| 8 | 2 | 12.2 | Epoxy; example |
| 9 | 3 | 10.9 | Phenol; example |
| 10 | 4 | 10.5 | Acrylic + crosslinking agent; example |
| 11 | 5 | 7.0 | Acrylic only; comparative example |
| 12 | 6 | 8.9 | No resin; comparative example |

Experimental Example 3

Chemically treated metal sheets were obtained in the same way as in Experimental Example 1, example that chemical conversion coating liquid No. 1 was coated on the same metal sheet as that used in Experimental Example 1, with the coating weight being variously altered, as shown in Table 7. Metal sheet-resin composite molded articles were then obtained in the same way as in Experimental Example 2, and the adhesive strengths were measured. The results are shown in Table 7. It was understood that in No. 13, in which the coating weight of the chemical conversion coating liquid was low, and No. 18, in which the coating weight of the chemical conversion coating liquid was too high, the adhesive strength was low.

TABLE 7

| Run No. | Coating liquid No. | coating weight of chemical conversion coating film (g/m2) | Adhesive strength (MPa) | Notes |
|---|---|---|---|---|
| 7 | 1 | 0.5 | 11.7 | Urethane + crosslinking agent; example |
| 13 | | 0.005 | 7.4 | Urethane + crosslinking agent; outside preferred range |
| 14 | | 0.01 | 9.8 | Urethane + crosslinking agent; example |
| 15 | | 0.05 | 11.9 | Urethane + crosslinking agent; example |
| 16 | | 0.1 | 12.8 | Urethane + crosslinking agent; example |
| 17 | | 1.0 | 9.2 | Urethane + crosslinking agent; example |
| 18 | | 2.0 | 5.7 | Urethane + crosslinking agent; outside preferred range |

Experimental Example 4

Chemically treated steel sheets were obtained by coating chemical conversion coating liquid No. 1 on a metal substrate in the same way as in Experimental Example 1. Metal sheet-resin composite molded articles were obtained in the same way as in Experimental Example 2, except that coating was carried out so that the film thickness of the adhesive layer in Experimental Example 2 was variously altered, as shown in Table 8. The adhesive strength results are shown in Table 8. No. 19, in which the film thickness of the adhesive layer was low, exhibited low adhesive strength. In addition, it was understood that as the film thickness increased, the adhesive strength increased, but this increase in adhesive strength leveled out at approximately 40 μm.

TABLE 8

| Run No. | Coating liquid No. | Film thickness (μm) of adhesive layer | Adhesive strength (MPa) | Notes |
|---|---|---|---|---|
| 7 | 1 | 20 | 11.7 | Urethane + crosslinking agent; example |
| 19 | | 2.5 | 7.4 | Urethane + crosslinking agent; outside preferred range |
| 20 | | 5 | 10.1 | Urethane + crosslinking agent; example |
| 21 | | 10 | 10.5 | Urethane + crosslinking agent; example |
| 22 | | 30 | 12.5 | Urethane + crosslinking agent; example |
| 23 | | 40 | 12.7 | Urethane + crosslinking agent; example |

TABLE 8-continued

| Run No. | Coating liquid No. | Film thickness (μm) of adhesive layer | Adhesive strength (MPa) | Notes |
|---|---|---|---|---|
| 24 | | 60 | 12.6 | Urethane + crosslinking agent; outside preferred range |

Experimental Example 5

Chemically treated steel sheets were obtained by coating chemical conversion coating liquid No. 1 on metal substrates in the same way as in Experimental Example 1. Metal sheet-resin composite molded articles were obtained in the same way as in Experimental Example 2, except that coating was carried out so that the quantity of colloidal silica in Experimental Example 2 was variously altered, as shown in Table 9. The adhesive strength results and the results of white rust incidence rate (%) after exposure to 5% salt water for 240 hours as shown in Table 9. It was understood that No. 25, which had a low content of colloidal silica, exhibited excellent adhesive strength but poor corrosion resistance, whereas No. 30, which had a high content of colloidal silica, exhibited excellent corrosion resistance but lower adhesive strength than the examples.

TABLE 9

| Run No. | Coating liquid No. | Quantity (parts) of colloidal silica | Adhesive strength (MPa) | White rust generation rate (%) | Notes |
|---|---|---|---|---|---|
| 7 | 1 | 50 | 11.7 | 2.5 | Urethane + crosslinking agent; example |
| 25 | | 12.5 | 12.3 | 20 | Urethane + crosslinking agent; outside preferred range |
| 26 | | 25 | 12.5 | 5 | Urethane + crosslinking agent; example |
| 27 | | 32.5 | 12.1 | 5 | Urethane + crosslinking agent; example |
| 28 | | 62.5 | 11.2 | 2.5 | Urethane + crosslinking agent; example |
| 29 | | 75 | 9.7 | <1.0 | Urethane + crosslinking agent; example |
| 30 | | 100 | 7.8 | <1.0 | Urethane + crosslinking agent; outside preferred range |

The quantity of colloidal silica is the quantity relative to a total of 50 parts by mass of the thermosetting resin and the crosslinking agent.
The white rust incidence rate is the value after being sprayed with 5% salt water for 240 hours.

Experimental Example 6

Chemically treated steel sheets were obtained by coating chemical conversion coating liquid No. 1 on metal substrates in the same way as in Experimental Example 1. Primer-treated metal substrates were obtained by coating a primer layer-forming composition, in which calcium ion exchanged silica ("Sylomask 52" manufactured by Fuji Silysia Chemical Ltd.) was dispersed at various contents between 0 and 30 vol. %, as shown in Table 10, in an acid-modified polypropylene-based adhesive ("UNISTOL® R-300" manufactured by Mitsui Chemicals, Inc.), at a film thickness of 10 μm on the chemical conversion coating film using a bar coater, and then heating and drying for 2 minutes at 220° C. Surface-treated metal sheets were obtained by using a bar coater to coat an acid-modified polypropylene-based adhesive ("UNISTOL® R-300" manufactured by Mitsui Chemicals, Inc.) (a coating material type adhesive suitable for polypropylene) at a film thickness of 10 μm on the primer layer, and then heating and drying for 2 minutes at 220° C. Injection molding was carried out in the same way as in Experimental Example 2, and the adhesive strengths of the obtained metal sheet-resin composite molded articles were measured. The adhesive strength results are shown in Table 10. All the examples exhibited high adhesive strengths. In addition, No. 31 and No. 32, which contained inorganic material, exhibited higher adhesive strength than No. 30, and it is thought that the reason for this is that because the coefficient of thermal expansion of the primer layer is close to the coefficient of thermal expansion of the steel sheet ($11.7 \times 10^{-6}$/° C.), residual thermal stress, which is generated by the difference between room temperature and the injection molding temperature, was reduced.

In addition, the adhesive strengths of the obtained metal sheet-resin composite molded articles were measured after being exposed to 5% salt water for 500 hours. No. 31 and No. 32 contained calcium ion exchanged silica, and therefore exhibited high rust-proofing properties and high adhesive strength even after being exposed to salt water.

TABLE 10

| Run No. | Coating liquid No. | Primer layer Rust inhibitor content (vol. %) | Coefficient of thermal expansion | Adhesive strength (MPa) | Adhesive strength (MPa) after being sprayed with salt water for 500 hours |
|---|---|---|---|---|---|
| 31 | 1 | 30 | 23 | 14.5 | 13.1 |
| 32 | 1 | 20 | 47 | 14.4 | 11.8 |
| 33 | 1 | 0 | 110 | 11.6 | 8.1 |

INDUSTRIAL APPLICABILITY

By combining the surface-treated metal sheet of the present invention with a molten resin inside a mold of an injection molding machine, a metal sheet-resin composite molded article can be produced easily and highly efficiently, and the adhesive strength between the metal sheet and the resin is high. The metal sheet-resin composite molded article of the present invention is useful as a component for vehicles, domestic appliances, office automation equipment, and the like.

The invention claimed is:

1. A surface-treated metal sheet, comprising a laminate comprising a metal substrate, a chemical conversion coating film and an adhesive layer in order,
wherein
the chemical conversion coating film comprises colloidal silica and a thermosetting resin,
the thermosetting resin is a water-based urethane resin,
a coating weight of the chemical conversion coating film is from 0.05 to 0.5 g/m², and
an amount of colloidal silica in the chemical conversion coating film is from 50 to 150 parts by mass relative to 100 parts by mass of the thermosetting resin.

2. The surface-treated metal sheet according to claim 1, wherein a primer layer is situated between the chemical conversion coating film and the adhesive layer.

3. The surface-treated metal sheet according to claim 1, wherein the chemical conversion coating film further comprises a silane coupling agent.

4. The surface-treated metal sheet according to claim 1, which has an adhesive strength of 9.7 to 12.5 MPa and a white rust generation rate of 5% or less.

5. A metal sheet-resin composite molded article, comprising the surface-treated metal sheet according to claim 1 combined with a resin molded article.

6. The metal sheet-resin composite molded article according to claim 5, wherein the resin molded article is a nylon resin molded article.

7. The metal sheet-resin composite molded article according to claim 5, wherein the resin molded article is a polypropylene resin molded article.

* * * * *